United States Patent Office 3,369,863
Patented Feb. 20, 1968

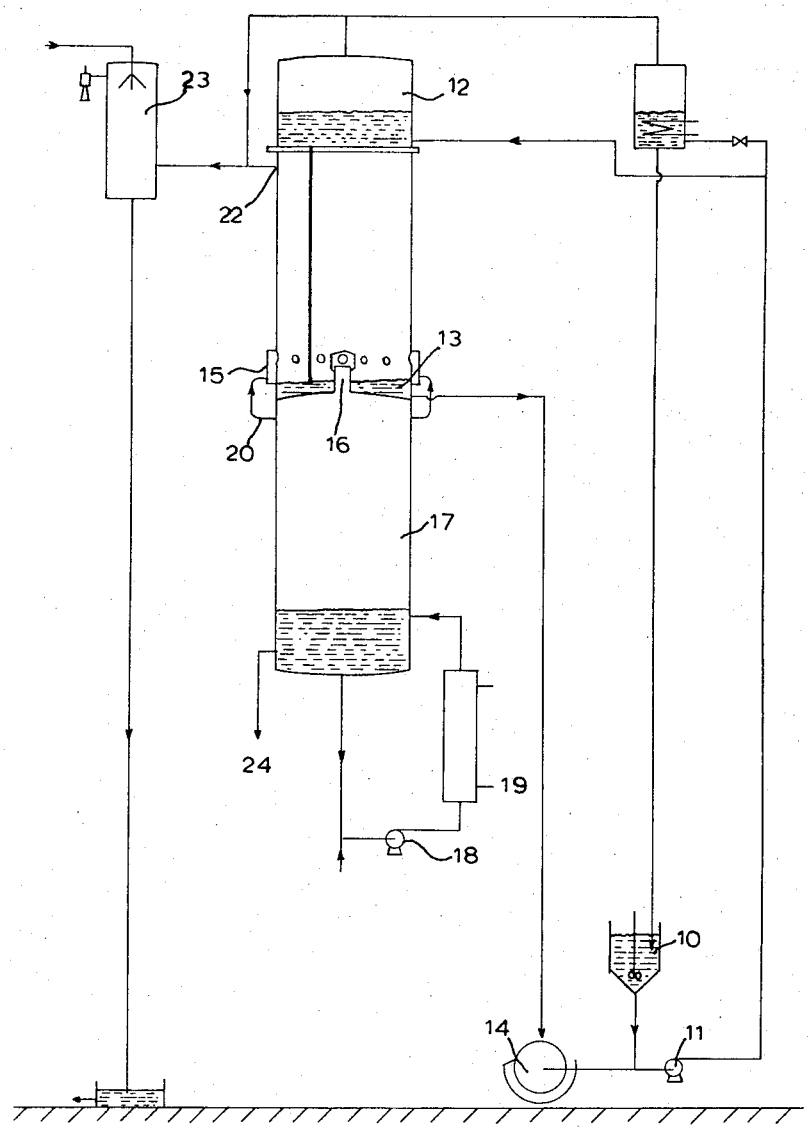

3,369,863
PROCESS FOR THE MANUFACTURE OF A
FLUOSILICATE OF A METAL
Leonard William Jones, Blackheath, and David Anthony
Lihou, Birmingham, England, assignors to Wellman
Incandescent Furnace Company Limited, Smethwick,
England, a British company
Filed Apr. 15, 1965, Ser. No. 448,485
2 Claims. (Cl. 23—88)

ABSTRACT OF THE DISCLOSURE

A continuous process for the manufacture of a fluosilicate of a metal from an aqueous solution containing fluosilicic acid, comprising the steps of heating the aqueous solution to produce fluorine-containing vapors, contacting such vapors in a contactor with a stream of an aqueous solution of a salt of a metal of the class consisting of light and heavy metals of Groups I and II, continuously removing the reaction products from the contactor, and recovering the fluosilicate of the metal from the reaction products.

Background of the invention

Fluorine is most usually recovered on a commercial scale in the form of the aqueous solution of fluosilicic acid ($H_2SiF_6$) as a byproduct in the production of superphosphates or phosphoric acid from phosphate rock which may contain about 3–4% of fluorine compounds. Because the partial pressure of the fluosilicic acid in equilibrium in an aqueous solution limits the acid content to about 15%, the transportation of the acid is relatively expensive. Furthermore because fluosilicates of potassium, sodium and like cations present in estuarine or brackish waters are usually insoluble and precipitate out, the condenser make-up water has to be relatively pure and this too increases the cost of production, particularly if the plant is not situated near a cheap supply of pure water.

Whilst the acid forms insoluble salts with appropriate metals, e.g. sodium or potassium as pointed out, the deliberate manufacture of such salts in the byproduct separation plant has not hitherto been considered an economic proposition because the insolubility would cause precipitation as the reaction proceeds necessitating batch production, and for various reasons including the low fluorine content the reagents have to be re-cycled continuously in order to obtain complete extraction of the fluorine compounds thereby necessitating continuous production.

Summary of the invention

The present invention solves this difficulty and enables continuous production to be achieved whilst producing insoluble fluorine compounds, although the invention is also applicable to the production of soluble compounds by a similar path.

In accordance with the invention considered broadly, a process for the manufacture of fluorine compounds comprises the step of reacting fluorine containing vapours with liquids to form fluorine compounds in the liquids, and is characterised in that the reactions are essentially such as to be irreversible and/or for there to be no tendency for the release of the said fluorine compounds from the liquid back into the vapour.

Whilst the invention in its broadest aspects can be carried out in many forms of contacting apparatus, it is preferred to use a scrubbing tower of the kind described in our copending application for Letters Patent, filed concurrently herewith, Serial No. 448,484, in which the descending columns of liquid remain intact and do not disintegrate into drops or sprays, in which case the invention is conveniently (but again not essentially) adapted for the production, in the streams, of insoluble fluorine compounds.

The invention therefore further consists in a process for the manufacture of fluorine compounds by the reaction of fluosilicic acid vapours with aqueous salt solutions in the form of continuous jets or streams in a contactor.

Preferably the contactor is a tower and the vapours may flow countercurrent and the compounds pass into a well at the foot of the tower.

Brief description of the drawing

The invention is now more particularly described by way of example and with reference to the accompanying drawing wherein the sole figure is a diagrammatic view of a plant for fluorine production.

Description of the preferred embodiments

To illustrate the chemistry involved, the plant may be primed with barium carbonate, barium chloride and hydrochloric acid added at 10 giving Equation 1:

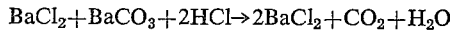

$$BaCl_2 + BaCO_3 + 2HCl \rightarrow 2BaCl_2 + CO_2 + H_2O$$

The carbon dioxide is discharged and the barium chloride fed to the tower via pump 11.

The streams of aqueous solution of the chloride then leave header tank 12 and pass in jet streams to react with the fluosilicic acid vapours in the tower, as Equation 2:

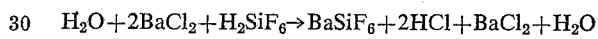

$$H_2O + 2BaCl_2 + H_2SiF_6 \rightarrow BaSiF_6 + 2HCl + BaCl_2 + H_2O$$

The solution containing the insoluble barium fluosilicate (in excess of solution) plus acid plus chloride is extracted from the well 13, the fluosilicate filtered off at 14, and the remainder recirculated via pump 11 with part passing via an evaporator before re-entry to the tower; in the evaporator excess water is removed, and conveniently the vacuum in the evaporator is similar to that in the tower. Salt may be added (i.e., the carbonate) in the stirred vessel 10 fed from the evaporator so as to receive concentrated solution of the hydrochloric acid plus barium chloride, and the reaction in the vessel is (3):

$$BaCO_3 + 2HCl \rightarrow BaCl_2 + CO_2 + H_2O$$

The carbon dioxide may be discharged from the vessel 10.

Flow from and to the tower, the evaporator and the stirred vessel may be controlled by suitable valves to maintain appropriate flow rates and concentrations.

It will be appreciated that the fluosilicate produced represents a convenient fluoride compound for storage, transportation and subsequent production of other fluorine compounds.

Any of a number of salts may be used including the chlorides, carbonates or hydroxides of for example sodium, potassium, barium, copper or caesium. A chloride is preferred because firstly fluosilicates decompose to fluorides in alkaline media, secondly the vacuum equipment for the tower, and the additional equipment required to cope with for example carbon dioxide being evolved in the tower might be uneconomic: hence the hydrochloric acid used in priming is preferably in excess of the stoichiometric amount and the reactions outside the tower are arranged to go to completion by providing suitable conditions.

It will also be appreciated that the reactions in the tower take place in the streams of solution so that precipitation occurs only in the well. It is a relatively simple matter to arrange for a jet plate confining the mass of solution in the head of the tower to have jet orifices related in size to the head above the plate, the degree of vacuum and temperature in the tower, and the height of the plate above the well, so that the streams do not disintegrate. Typically jet sizes of the order of ⅛–⅜″ may be used.

The volatile fluorine compound vapours may be fed into the tower peripherally through tuyeres 15 or the like about and slightly above the well, but depending upon the cross-sectional area of the tower it may be desirable to provide additional inlets 16 within the periphery, for example via shielded pipes projecting through the well.

It is to be understood that whilst the invention enables insoluble fluorine salts to be produced in a continuous process, the invention and the necessary plant may also be employed with soluble fluosilicates. For example, a solution of zinc salt or calcium or some other cation which forms a soluble fluosilicate may be used: in such a case crystallisation, evaporation or other technique may be used to separate and purify the salt.

The tower may also be employed, using a part of the structure below the well, in the production of the fluosilicic acid vapours of adequate richness for reaction in the tower above the well. For example the lower part 17 of the tower may contain the mixture of phosphoric and fluosilicic acids produced by the reaction of sulphuric acid, recirculated phosphoric acid and phosphate rock, the dilute reaction products being fed to the tower via a pump 18 and heat exchanger 19, the volatile fluorine compounds passing off through bypass pipes 20 or stand pipes to the space above the well and flowing countercurrent to the descending streams of aqueous solution, unreacted vapours including water vapour exiting from the tower at 22 below the jet plate and passing to a condenser 23 from which uncondensed vapours are extracted. Acid solutions may be continuously recirculated from the tower base via a pump and with fresh dilute acids added, relatively concentrated acid (phosphoric) being withdrawn at 24 from the tower base from time to time or continuously.

The tower and other parts of the plant will be protected against corrosion in conventional manner.

The invention also resides in apparatus for carrying out the processes referred to.

We claim:

1. A continuous process for the manufacture of a fluosilicate of a metal from an aqueous solution containing fluosilicic acid, wherein the improvement comprises the steps of heating the aqueous solution to produce fluorine-containing vapors, contacting such vapors in a contactor with a stream of an aqueous solution of a salt of a metal of the class consisting of light and heavy metals of Groups I and II, continuously removing the reaction products from the contactor, recovering the fluosilicate of the metal from the reaction products, replenishing the metal salt in the resulting solution, and recycling the solution to the contactor.

2. A continuous process for the manufacture of a fluosilicate of a metal from an aqueous solution containing fluosilicic acid, wherein the improvement comprises the steps of heating the aqueous solution to produce fluorine-containing vapors, contacting such vapors in a contactor with a stream of an aqueous solution of a chloride of a metal of the class consisting of light and heavy metals of Groups I and II, continuously removing the reaction products from the contractor, recovering the fluosilicate of the metal from the reaction products, then adding the carbonate of the metal to react with the hydrochloric acid formed as a byproduct, with elimination of carbon dioxide, and recycling the resulting solution to the contactor.

References Cited
UNITED STATES PATENTS

| | | | |
|---|---|---|---|
| 2,141,773 | 12/1938 | Strathmeyer | 23—88 |
| 2,447,359 | 8/1948 | Oakley | 23—88 |
| 3,091,513 | 5/1963 | Parish | 23—153 |
| 1,648,143 | 11/1927 | McQuaid | 23—88 |
| 2,556,064 | 6/1951 | Caldwell et al. | 23—88 |
| 2,584,894 | 2/1952 | MacIntire | 23—88 |
| 2,602,726 | 7/1952 | Winter | 23—88 |
| 2,728,634 | 12/1955 | Miller | 23—88 |
| 2,790,705 | 4/1957 | Kean et al. | 23—88 |
| 2,816,818 | 12/1957 | Gross | 23—88 |
| 2,865,709 | 12/1958 | Horn et al. | 23—88 |
| 3,273,963 | 9/1966 | Gunn | 23—88 |

OSCAR R. VERTIZ, *Primary Examiner.*

EDWARD STERN, *Examiner.*